United States Patent
Bruderek et al.

(10) Patent No.: US 10,956,297 B2
(45) Date of Patent: Mar. 23, 2021

(54) SYSTEM BOARD FOR A COMPUTER SYSTEM, COMPUTER SYSTEM HAVING SUCH A SYSTEM BOARD AND METHOD OF OUT-OF-BAND MONITORING OF A COMPUTER SYSTEM

(71) Applicant: Fujitsu Technology Solutions Intellectual Property GmbH, Munich (DE)

(72) Inventors: Timo Bruderek, Munich (DE); Jürgen Atzkern, Munich (DE); Nils Wittler, Munich (DE); Joachim Bub, Munich (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 93 days.

(21) Appl. No.: 16/108,135

(22) Filed: Aug. 22, 2018

(65) Prior Publication Data
US 2019/0065340 A1  Feb. 28, 2019

(30) Foreign Application Priority Data
Aug. 24, 2017  (DE) .................... 10 2017 119 379.0

(51) Int. Cl.
*G06F 11/34* (2006.01)
*G06F 11/36* (2006.01)
(Continued)

(52) U.S. Cl.
CPC ...... *G06F 11/3495* (2013.01); *G06F 11/3006* (2013.01); *G06F 11/3055* (2013.01);
(Continued)

(58) Field of Classification Search
CPC ........ H04L 67/34; H04L 67/125; G06F 11/36; G06F 11/34
See application file for complete search history.

(56) References Cited

U.S. PATENT DOCUMENTS 5,815,071 A * 9/1998 Doyle ................ B60K 31/0058
340/439
7,623,949 B2 * 11/2009 Nou ....................... G07C 5/008
340/539.13
(Continued)

FOREIGN PATENT DOCUMENTS

| EP | 2 608 046 A1 | 6/2013 |
| EP | 2 977 889 A1 | 1/2016 |

OTHER PUBLICATIONS

Search Report dated Jan. 21, 2019, of counterpart Great Britain Application No. GB1813318.1.
(Continued)

*Primary Examiner* — Shirley X Zhang
(74) *Attorney, Agent, or Firm* — DLA Piper LLP (US)

(57) ABSTRACT

A system board for a computer system includes a management unit set up to collect status information from system components of the computer system, a network interface, and a communication unit set up separately from the management unit, connected to the network interface and containing a software for communication via network, wherein the management unit is set up to transfer collected status information from system components of the computer system to the software within the communication unit, and the software within the communication unit is set up exclusively to incorporate the collected status information into a communication protocol for communication via the network interface within a network.

18 Claims, 1 Drawing Sheet

(51) Int. Cl.
*H04L 29/08* (2006.01)
*H04L 12/24* (2006.01)
*H04L 12/26* (2006.01)
*G06F 11/30* (2006.01)
*G06F 13/40* (2006.01)

(52) U.S. Cl.
CPC ...... *G06F 13/4063* (2013.01); *H04L 41/0246* (2013.01); *H04L 43/0817* (2013.01); *H04L 67/125* (2013.01)

(56) References Cited

U.S. PATENT DOCUMENTS

| | | | |
|---|---|---|---|
| 8,295,157 | B1 | 10/2012 | Pimentel et al. |
| 2004/0081202 | A1 | 4/2004 | Minami et al. |
| 2014/0195704 | A1* | 7/2014 | Bhatia ................. G06F 11/3003 710/105 |
| 2014/0208133 | A1* | 7/2014 | Gopal ................. G06F 11/2294 713/310 |
| 2015/0082063 | A1* | 3/2015 | Peterson ................. G06F 13/40 713/323 |
| 2015/0215414 | A1 | 7/2015 | Kariman |
| 2016/0036628 | A1 | 2/2016 | Gupta |
| 2016/0093216 | A1* | 3/2016 | Lee ................. G06Q 10/063114 340/870.11 |
| 2016/0283424 | A1* | 9/2016 | Richardson ........... G06F 11/301 |
| 2017/0124871 | A1* | 5/2017 | Sunadham ............... H04Q 9/00 |
| 2017/0228945 | A1* | 8/2017 | Lee ........................ G08C 17/02 |
| 2018/0040172 | A1* | 2/2018 | Funk ................ H04W 12/1204 |
| 2018/0278692 | A1* | 9/2018 | Okayama ................ H04L 67/28 |
| 2018/0283048 | A1* | 10/2018 | Hage .................... G06Q 10/083 |

OTHER PUBLICATIONS

T. Schwenkler, "Intelligent Platform Management Interface," Sicheres Netzwerkmanagement: Konzepte, Protokolle, Tools, 2006, pp. 169-207 w/English abstract.

Nikola Rajovic et al., "The Mont-Blanc prototype: An Alternative Approach for HPC Systems," High Performance Computing, Networking, Storage and Analysis, SC16: International Conference for IEEE, 2016, pp. 444-455.

* cited by examiner

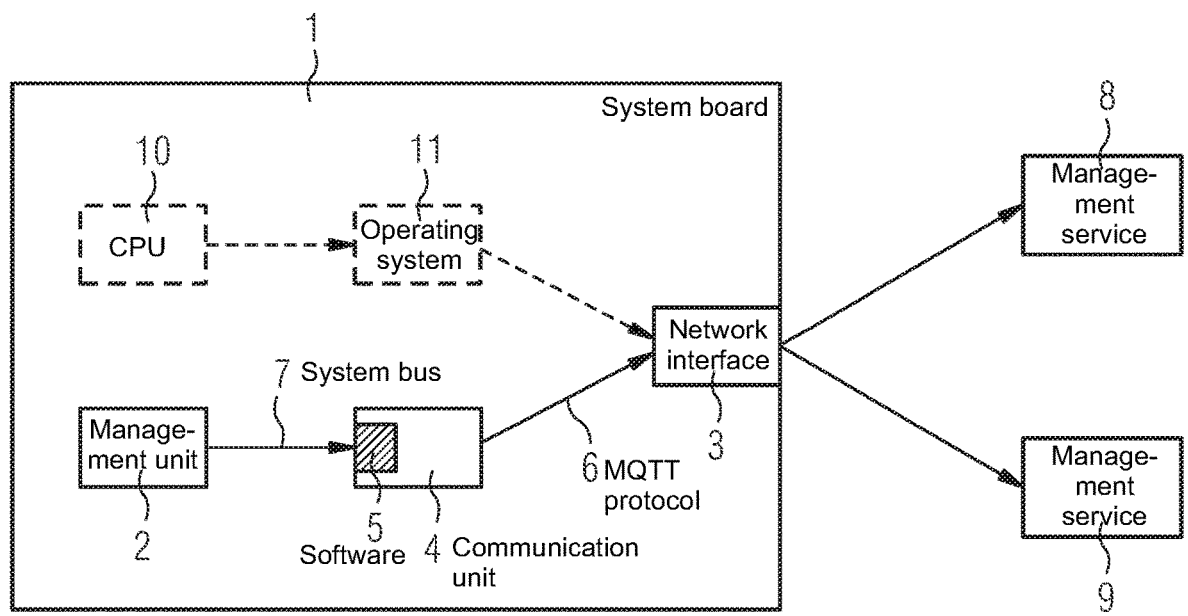

SYSTEM BOARD FOR A COMPUTER SYSTEM, COMPUTER SYSTEM HAVING SUCH A SYSTEM BOARD AND METHOD OF OUT-OF-BAND MONITORING OF A COMPUTER SYSTEM

TECHNICAL FIELD

This disclosure relates to a system board for a computer system, a computer system having such a system board and a method of out-of-band monitoring of a computer system.

BACKGROUND

To date, management of an infrastructure in a computer system has conventionally been effected by installing a piece of management software within or under the control of the operating system. The management software transmits health data, telemetry data and status information from system components of the computer system or the system board (e.g., parameters for fans, temperature, voltages and so on) to the operating system or a dedicated management environment, e.g., a management server.

The consequence of such in-band management is that the collected system information can be captured and evaluated, and is available for an administrator of the PC infrastructure only if the management software, the operating system itself and the hardware of the computer system run correctly. If an error occurs in the operating system, the management software or the hardware of the computer system, however, there is the risk that the management software is no longer fully functional and status information from system components of the computer system can no longer be collected, let alone evaluated. There is also a disadvantage that dedicated management software for such purposes is often programmed individually and is therefore complex and costly, not least on account of the software updates that continually need to be performed. Further, connection of the management software to a management environment set up outside the computer system is often effected using proprietary communication protocols that make integration into existing installations or systems often laborious and complicated.

There are already solutions for what is known as out-of-band management, which involves status information from the system components of a computer system being captured and evaluated independently of management software running within an operating system. Such approaches require elaborate architectures and expensive management components, however, which need to be set up specifically for such purposes in the computer system.

It could therefore be helpful to provide a system board for a computer system and a method of out-of-band monitoring of a computer system that allow simple and inexpensive management of a computer system.

SUMMARY

We provide a system board for a computer system including a management unit set up to collect status information from system components of the computer system, a network interface, and a communication unit set up separately from the management unit, connected to the network interface and containing a software for communication via network, wherein the management unit is set up to transfer collected status information from system components of the computer system to the software within the communication unit, and the software within the communication unit is set up exclusively to incorporate the collected status information into a communication protocol for communication via the network interface within a network.

We also provide a method of out-of-band monitoring of a computer system including collecting status information from system components of the computer system by a management unit set up on a system board of the computer system, transferring the collected status information of the system components of the computer system from the management unit to a software within a communication unit, wherein the communication unit is set up separately from the management unit on the system board of the computer system and connects to a network interface, exclusively incorporating the collected status information into a communication protocol by the software within the communication unit, and sending data in accordance with the communication protocol containing the collected status information by the communication unit using the network interface within a network.

BRIEF DESCRIPTION OF THE DRAWING

The FIGURE shows a schematized depiction of an arrangement of a system board and multiple external management options.

LIST OF REFERENCE SIGNS

1 System board
2 Management unit
3 Network interface
4 Communication unit
5 Software
6 Communication protocol
7 System bus
8 Management service
9 Management service
10 CPU
11 Operating system

DETAILED DESCRIPTION

Our system board comprises a management unit set up to collect status information from system components of the computer system. Further, the system board comprises a network interface and a communication unit set up separately from the management unit. The communication unit connects to the network interface. Additionally, the communication unit contains a piece of software for communication via network.

The management unit is set up to transfer collected status information from system components of the computer system to the software within the communication unit. The software within the communication unit is exclusively set up to incorporate the collected status information into a communication protocol for communication via the network interface within a network.

Such a system board allows the management of an associated computer system in a simple manner. An essential aspect of this system board is that components can be utilized that are already prepared or installed on the system board (for other functionalities). The management unit is used to collect status information from system components of the computer system. By way of example, the management unit may be a management chip already set up for these purposes, e.g., what is known as a system management chip (SMC). By way of example, the communication unit may be realized by a communication chip set up separately from the management unit and likewise set up on the system board to connect the system board to a network. By way of example, the communication unit may be realized by or within what is known as a management engine. By way of example, the communication unit may be set up as part of a chipset in the computer system. The communication unit connects to the network interface and contains a piece of software for communication via network.

In a system board of the type explained here, the management unit is set up to transfer collected status information from system components of the computer system to the software within the communication unit. The software in this case is of such simple design that it is set up exclusively to incorporate the collected status information into a communication protocol for communication via the network interface within a network. The software is used in this instance to exclusively convert or incorporate the collected status information into a defined communication protocol. In this manner, the software can be kept very simple and low-maintenance. By way of example, the software may be a software application installed within the communication unit for the purposes explained.

In this manner, the management unit utilizes the network link of the communication unit to send collected status information from system components of the computer system via the network interface within a network. An applicable communication protocol implementation is provided by the software within the communication unit, the software being set up exclusively for these purposes.

In this manner, very simple capture and network forwarding of status information of a computer system in which the system board explained is used is possible. The system board works more or less as a sensor to capture status and error information or generally telemetry data of the computer system. Management is provided in a simple manner by virtue of particular tasks of already preinstalled units on the system board being combined synergistically. Special, complex and expensive components for out-of-band management of the computer system are not necessary for this solution. In this manner, the system board of the type explained provides a very inexpensive and simple out-of-band management of a computer system.

The management unit may connect to the communication unit via a system bus. By way of example, the management unit may connect to the communication unit via what is known as a system management bus (SM bus). In this regard, an existing infrastructure within the computer system, or on the system board of the computer system, can be utilized.

The management unit may be set up without its own connection to a network interface. As explained above, the management unit uses the network link of the communication unit, the latter being connected to the network interface for communication within a network. A separate network link (separate network interface) for the management unit is therefore not necessary. In this manner, the management unit can be realized inexpensively by one or more components preinstalled on the system board. In particular, no special management chips with a network link such as what is known as a baseboard management controller (BMC), for example, are needed.

Only the management unit is used to collect applicable status information from system components of the computer system in some examples. As explained above, the communication unit is used only as a type of network proxy to incorporate the status information collected by the management unit into an applicable communication protocol. The communication unit is to this end, as explained, equipped with the software kept very simple. A further functionality of the communication unit is not required in this case. Owing to the simplicity of the software, which may be set up only to incorporate the status information into the communication protocol, it is possible for a high level of security against manipulations of the computer system to be ensured. Even if the communication unit as such performs other cross-system and extensive functionalities within the computer system, it is merely reduced to the function of a network proxy for the stated purposes. This prevents the communication unit from initiating unwanted or even security-critical processes within the computer system by the software. Owing to the simplicity of the software, it is therefore, e.g., possible to upgrade a communication unit (e.g., management engine) already prepared within a chipset with the functionality of incorporating the status information into a communication protocol without jeopardizing the security of the computer system against manipulations.

The system board may be set up such that the management unit exclusively collects status information from system components of the computer system. In this case, the communication unit does not have such a functionality itself. In this manner, the communication unit can be implemented very simply and inexpensively within the framework of its other functionalities (which are not explained further here).

Our computer system may have a system board of the type explained. The computer system allows very simple out-of-band monitoring of its system components. In particular in environments in which the computer system is difficult or impossible to access, status information from system components of the computer system can be output to the outside via network in a simple manner. In particular in the event of an error in which the operating system of the computer system is erroneous or has not started up at all or when the starting process of the computer system is erroneous so that the computer system does not boot correctly, it is nevertheless possible for status information about the interaction of the components based on the type explained to be captured and sent via network provided that operation of the components involved is still ensured in the event of such an error. In this manner, the computer system having the applicable system board allows reliable out-of-band management precisely in the event of errors at a place of use that is difficult to access.

Our method comprises the following steps:

collecting status information from system components of the computer system by a management unit set up on a system board of the computer system, transferring the collected status information of the system components of the computer system from the management unit to a piece of software within a communication unit, wherein the communication unit is set up separately from the management unit on the system board of the computer system and connects to a network interface, exclusively incorporating the collected status information into a communication protocol by the software within the communication unit, and sending data in accordance with the communication protocol containing the collected status information by the communication unit using the network interface within a network.

Such a method allows simple and inexpensive out-of-band monitoring of a computer system. The method can involve individual functions of components already preinstalled on the system board being utilized synergistically. It is thus possible for status information to be collected by the management unit, which is already set up as a management chip, in particular as a system management chip, on the system board, for example. The collected status information of the system components is transferred to a piece of software within the communication unit that acts as a type of network proxy. The software within the communication unit is implemented in such simple fashion that the communication unit exclusively incorporates the collected status information into a communication protocol. Subsequently, the status information incorporated within the communication protocol is sent by the communication unit using the network interface within a network.

A complicated method of out-of-band monitoring of a computer system using expensive components specifically set up for this purpose is not necessary in this case. Rather, the communication unit is used only for network communication from the point of view of the management unit, the communication unit being upgraded via the software as appropriate. Therefore, besides implementation of the interaction between the management unit and the communication unit (this being able to be implemented in a simple manner by virtue of communication via a system bus such as an SM bus), it is merely necessary for the software to be implemented within the communication unit to be able to perform the steps according to the method. The software exclusively provides the functionality of incorporating the status information collected by the management unit into a communication protocol for sending within a network. A further functionality is not provided by the software. Therefore, the software is kept very simple, against the background of security against manipulation.

In examples of the method, the management unit has no own connection to a network interface. Rather, the management unit uses the network link of the communication unit. In this manner, there is no need for provision of an expensive management unit set up specifically for the purpose. Rather, a system management chip already set up on the system board can be used for the stated purposes.

The management unit may exclusively collect status information from system components of the computer system. In this case, it is not necessary for the communication unit itself to collect status information from system components of the computer system. In this manner too, simple integration of the method explained into already existing components on a system board of the computer system is possible. The communication unit may be part of what is known as a management engine within a chipset of the computer system, for example.

The method may be performed without a connection to a main processor or to a (main) operating system of the computer system. This has the advantage that the method is performable completely independently of the main processor or of the (main) operating system. Even if the (main) operating system is erroneous or has not started up and/or the main processor of the computer system is erroneous or there is another error in the computer system, it is nevertheless possible for any status information of the computer system to be collected by the method explained and sent to the outside via network. In this manner, pure out-of-band management of the computer system is performable totally independently of what are known as in-band components.

The communication protocol may be what is known as a message queue telemetry transport protocol (MQTT). MQTT is frequently used in what are known as Internet-Of-Things (IoT) applications to transmit data. MQTT can therefore be used to send status information from system components to a connected management service, for example, in a simple manner. What is known as an MQTT broker can be used to send status information to an applicable communication partner within the management service. The MQTT broker can contain the entire data situation of its communication partners. In this manner, it is not necessary to store a complex picture of the situation of the monitored computer system in the computer system itself. Rather, the collected status information can be sent by network to outside the computer system, and processed further there, in a simple manner as per the method.

A further advantage of MQTT is that no open network ports (known as listening ports) need to be set up on the network interface of the computer system to be monitored. Rather, the computer system to be monitored itself can set up a connection to an external management service or to an MQTT broker to transmit applicable status information.

A further advantage of MQTT is that its standardization means that it is integrable into already existing management services in a simple manner. Therefore, the method of the type explained can be realized via existing management services in a simple manner without having to set up special devices, e.g., special management servers with proprietary communication protocols.

All of the features, aspects and implementations of the system board explained and the computer system may be found in corresponding features, measures and steps of the method explained, and vice versa.

This disclosure is explained in more detail below on the basis of an example with reference to a drawing.

The FIGURE shows, in particular, a system board 1 on which a management unit 2, a communication unit 4 and a network interface 3 are set up. The management unit 2 may be set up as a system management chip on the system board 1, for example. The system management chip comprises a microcontroller and a piece of firmware. The management unit 2 collects status information from system components (not depicted in more detail) of the computer system in which the system board 1 may be set up. By way of example, such status information comprises fan speeds of fans set up in the computer system, subassembly temperatures, interior temperatures, error or status codes of subassemblies and components and so on. To this end, the management unit 2 may connect to the applicable subassemblies and components or the sensors thereof via applicable bus lines (e.g., of a system management bus).

The communication unit 4 is set up separately from the management unit 2 on the system board 1. By way of example, the communication unit 4 may be set up in the form of a management engine within the chipset on the system board 1. The communication unit 4 has a piece of software 5. By way of example, the software 5 may be stored as a software application in a memory of the communication unit 4 and is executed by a separate processor or microcontroller of the communication unit 4.

Besides these components, a CPU 10 and an operating system 11 stored in a memory are also set up on the system board 1. The CPU 10 processes information under the control of the running operating system 11 in a conventional manner. The network interface 3 can be used in this case to set up a network connection to outside the system board 1 to send or receive data and information via network. This approach is consistent with a conventional approach of operating the computer system in which the system board 1 is set up. Such processes between CPU 10, operating system 11 and network interface 3 are understood as in-band operation here and are depicted merely in schematized fashion.

Besides the in-band operation, the components 2, 4 and 3 explained are set up for out-of-band operation of the system board 1.

The management unit 2 connects to the communication unit 4 via a system bus 7, in particular. The management unit 2 is set up to transfer the collected status information from system components of the computer system to the communication unit 4, more precisely to the software 5 within the communication unit 4. This can involve, e.g., the management unit 2 accessing the software 5 within the communication unit 4 and transferring the collected status information from the system components of the computer system to the software 5. Alternatively, the communication unit 4, for example, using its software 5, itself accesses the management unit 2 and calls up the collected status information from the management unit 2. The management unit 2 itself has no own connection to a network interface, in particular no own connection to the network interface 3. In this manner, the management unit 2 can be realized by a conventionally present system management chip and can be kept very simple without having to provide a separate network interface for network communication.

The software 5 within the communication unit 4 is of such simple design that the software 5 exclusively incorporates the status information from the system components, which is obtained from the management unit 2, into a communication protocol 6 for communication via the network interface 3 within a network. This means that the software 5 merely performs a conversion of a data format between the management unit 2 and the communication unit 4 (in accordance with the system bus 7) into a data format in accordance with the communication protocol 6. The software 5 has no further tasks beyond that. In this manner, the software 5 is generic software that is of minimalistic design and used only to incorporate the collected status information into the communication protocol 6.

The communication unit 4 may be implemented such that the software 5 is the only software within the communication unit 4. It is at least possible for the communication unit 4 to be set up such that the software 5 is the only software to process the status information collected by the management unit 2. The communication unit 4 can comprise not only the functionalities explained, but also further functionalities not explained in more detail here. In the example shown in the FIGURE, however, the management unit 2 is exclusively set up to collect applicable status information from system components of the computer system. This means that the status information is collected exclusively by the management unit 2 and not additionally by the communication unit 4, for example.

After the collected status information is transferred from the management unit 2 to the software 5 within the communication unit 4 and after the collected status information is incorporated into the communication protocol 6 by the software 5, the collected status information can be sent as data in accordance with the communication protocol 6 by the communication unit 4 using the network interface 3 within a network. The communication unit 4 accordingly acts as a network proxy for the management unit 2, the latter making use of the network link of the communication unit 4 to the network interface 3.

The data in accordance with the communication protocol 6 can be sent via the network interface 3 from the system board 1 to various management and monitoring components 8 and 9 via network. The components 8 and 9 may be management services outside the computer system that are connected to the computer system or the system board 1 via network. By way of example, the management service 8 may be an administration computer system within a local area network (LAN) via which the system board 1 or the computer system is connected. By way of example, an administrator has access to the management service 8 to evaluate and diagnose the data sent by network, that is to say the status information contained in the communication protocol 6. The management service 8 may therefore be an on-premise service.

The management service 9 can comprise a cloud service and may be set up as a management server contactable from the system board 1 via Ethernet/Internet, for example. The management service 9 can be provided and maintained by an IT administration service provider, for example.

Preferably, the communication protocol 6 is executed in accordance with the MQTT standard. This means that the collected status information is sent from the system board 1 via the network interface 3 to one or both of the management services 8 and 9 within the MQTT protocol. One or both of the management services 8 and 9 may be embodied as an MQTT broker to forward the transmitted status information to further administration systems (not depicted). Alternatively, it is also possible for a special MQTT broker to be interposed between the system board 1 and the management services 8 and 9 (not depicted).

An advantage of the use of MQTT as a communication protocol 6 is that the system board 1 does not need to have any open network ports (listening ports) on the network interface 3. This means that no kind of connection from the outside, e.g., from the management services 8 and 9 or from a dedicated MQTT broker, can be set up to the network interface 3 of the system board 1. Rather, the system board 1 uses the network interface 3 to set up a connection to the outside to the applicable management services 8 and 9 and to applicable MQTT brokers. Data in accordance with the communication protocol 6 are therefore forwarded from the system board 1 to MQTT brokers and to the management services 8 and 9 (push mode).

A further advantage of MQTT is that the system board 1 or the out-of-band monitoring in accordance with the type explained can be integrated into existing systems in a simple manner. There is therefore no need for a specifically set-up management server. In particular, existing cloud solutions can be used. It is possible, e.g., for data to be sent to already existing services in accordance with predictive maintenance via MQTT in a simple manner. It is thus possible for telemetric monitoring of the computer system to be combined with telemetric monitoring of systems or industrial installations that are monitored and controlled via the computer system itself.

In this manner, the system board 1 allows simple and inexpensive out-of-band monitoring of system components of the computer system by a synergistic interaction of the management unit 2, the communication unit 4 and the network interface 3, these components being able to be realized by components conventionally set up on the system board 1, without there being a need to set up complex and expensive additional components. In particular, the setup of a special, network-compatible chip such as a BMC, is dispensed with. Rather, components conventionally set up on the system board 1 undertake the individual tasks and functions by taking advantage of the tasks and functions of the other components.

The measures explained can be performed without any connection to the CPU 10 or the operating system 11, i.e., without any connection to in-band components. This has the advantage that collection and sending of status information may be possible even if the computer system has not started up or is erroneous during startup. By way of example, the CPU 10 and/or the operating system 11 may have malfunctions that prevent startup of the computer system. It is also possible for errors to occur in a cycle of a basic input output system (BIOS) of the computer system, which in turn prevent startup of the computer system. Provided that the components 2, 3 and 4 are functional, however, status information for the system components of the computer system can be captured and output to the outside via network in any case. This allows simple evaluation of instances of error by management services 8 and 9 without the need for direct physical access to the system board 1 or the computer system. In this manner, very simple out-of-band remote maintenance is accomplished. The system board 1 operates more or less as a sensor for status information from system components of the computer system.

A possible application of the explained system board 1 within a computer system is provided by virtue of the computer system being set up as an industrial PC at an exposed place of use. By way of example, the computer system can be used as a control installation in a wind power installation such as, e.g., on a wind turbine. In the event of an error in the computer system, status information about the system board 1 can be output to the outside to applicable management services by network or by Internet connection. In this manner, the computer system can be monitored and remotely maintained simply.

The system board 1 may be set up to obtain control commands from the external management services 8 and 9 via the network interface 3. By way of example, it is possible for the system board 1 to use the network interface 3 to set up a connection to one or both of the management services 8 and 9 to call up applicable control commands (what is known as polling). Applicable control commands can then be transmitted back using a set-up connection and converted into applicable system bus data 7 by the communication protocol 6 and the communication unit 4 or the software 5 thereof and transferred to the management unit 2 so that the latter is controllable via the external management services 8 and 9 by network. Alternatively or additionally, it is also possible for other components of the system board 1 such as, e.g., the communication unit 4, to be controlled in this manner.

In further examples, the management unit 2 performs preprocessing, e.g., filtering or pre-examination, of the status information before the collected status information is transferred to the communication unit 4. In this manner, the traffic between the management unit 2 and the communication unit 4 can be concentrated on essential information and performance can be kept high.

The schematized example depicted in the FIGURE is chosen merely by way of example.

The invention claimed is:

1. A system board for a computer system comprising:
   a processor,
   a management unit set up to collect status information from system components of the computer system,
   a network interface, and
   a communication unit set up separately from the management unit, connected to the network interface and containing a software for communication via network,
   wherein the management unit is set up to transfer collected status information from system components of the computer system to the software within the communication unit without any connection to the processor, and
   the software within the communication unit is set up exclusively to incorporate the collected status information into a communication protocol for communication via the network interface within a network without any connection to the processor,
   wherein the communication protocol is a message queue telemetry transport (MQTT) protocol.

2. The system board according to claim 1, wherein the management unit is linked to the communication unit via a system bus.

3. The system board according to claim 1, wherein the management unit is set up without an own connection to a network interface.

4. The system board according to claim 1, wherein, exclusively, the management unit is set up to collect status information from system components of the computer system.

5. A computer system comprising the system board according to claim 1.

6. A method of out-of-band monitoring of a computer system comprising:
   collecting status information from system components of the computer system by a management unit set up on a system board of the computer system,
   transferring the collected status information of the system components of the computer system from the management unit to a software within a communication unit without any connection to a processor on the system board of the computer system, wherein the communication unit is set up separately from the management unit on the system board of the computer system and connects to a network interface,
   exclusively incorporating the collected status information into a communication protocol by the software within the communication unit without any connection to the processor on the system board of the computer system, and
   sending data in accordance with the communication protocol containing the collected status information by the communication unit using the network interface within a network,
   wherein the communication protocol is a message queue telemetry transport (MQTT) protocol.

7. The method according to claim 6, performed without a connection to an operating system of the computer system.

8. The method according to claim 6, wherein the management unit has no own connection to a network interface.

9. The method according to claim 6, wherein, exclusively, the management unit collects status information from system components of the computer system.

10. The system board according to claim 2, wherein the management unit is set up without an own connection to a network interface.

11. The system board according to claim 2, wherein, exclusively, the management unit is set up to collect status information from system components of the computer system.

12. The system board according to claim 3, wherein, exclusively, the management unit is set up to collect status information from system components of the computer system.

13. A computer system comprising the system board according to claim 2.

14. A computer system comprising the system board according to claim 3.

15. A computer system comprising the system board according to claim 4.

16. The method according to claim 7, wherein the management unit has no own connection to a network interface.

17. The method according to claim 7, wherein, exclusively, the management unit collects status information from system components of the computer system.

18. The method according to claim 8, wherein, exclusively, the management unit collects status information from system components of the computer system.

* * * * *